(12) United States Patent
Nadupparambil Sekharen et al.

(10) Patent No.: US 9,115,442 B2
(45) Date of Patent: Aug. 25, 2015

(54) ELECTRODEPOSITION OF AN AUTODEPOSITABLE POLYMER

(71) Applicant: HENKEL AG & CO. KGAA, Duesseldorf (DE)

(72) Inventors: Manesh Nadupparambil Sekharen, Midland, MI (US); Shawn E. Dolan, Sterling Heights, MI (US); Brian J. Marvin, Sterling Heights, MI (US); Bashir M. Ahmed, Rochester, MI (US); John D. McGee, Troy, MI (US); Omar L. Abu-Shanab, Rochester Hills, MI (US); Derek A. Hickey, Warren, MI (US)

(73) Assignee: Henkel AG & Co. KGaA, Duesseldorf (DE)

( * ) Notice: Subject to any disclaimer, the term of this patent is extended or adjusted under 35 U.S.C. 154(b) by 0 days.

(21) Appl. No.: 13/834,961

(22) Filed: Mar. 15, 2013

(65) Prior Publication Data

US 2014/0262791 A1 Sep. 18, 2014

(51) Int. Cl.
*C25D 13/10* (2006.01)
*C25D 11/02* (2006.01)
*C25D 9/02* (2006.01)
*C09D 5/44* (2006.01)
*C09D 7/12* (2006.01)

(52) U.S. Cl.
CPC .............. *C25D 11/02* (2013.01); *C09D 5/4484* (2013.01); *C09D 7/125* (2013.01); *C09D 7/1216* (2013.01); *C25D 9/02* (2013.01)

(58) Field of Classification Search
CPC ........ C25D 11/02; C25D 9/02; C09D 5/4484; C09D 7/1216; C09D 7/125
USPC ........................................................ 204/494
See application file for complete search history.

(56) References Cited

U.S. PATENT DOCUMENTS

| | | |
|---|---|---|
| 3,063,877 A | 11/1962 | Schiffman |
| 3,585,084 A | 6/1971 | Steinbrecher et al. |
| 3,592,699 A | 7/1971 | Steinbrecher et al. |
| 3,658,662 A | 4/1972 | Casson, Jr. |
| 3,674,567 A | 7/1972 | Bradley et al. |
| 3,791,431 A | 2/1974 | Steinbrecher et al. |
| 3,795,546 A | 3/1974 | Hall et al. |
| 3,829,371 A | 8/1974 | Miki et al. |
| 4,030,945 A | 6/1977 | Hall et al. |
| 4,076,677 A | 2/1978 | Sekmakas |
| 4,104,100 A | 8/1978 | Anders et al. |
| 4,108,817 A | 8/1978 | Lochel, Jr. |
| 4,178,400 A | 12/1979 | Lochel, Jr. |
| 4,180,603 A | 12/1979 | Howell, Jr. |
| 4,186,226 A | 1/1980 | Smith |
| 4,234,704 A | 11/1980 | Sakanaka et al. |
| 4,242,379 A | 12/1980 | Hall et al. |
| 4,289,826 A | 9/1981 | Howell, Jr. |
| 4,636,264 A | 1/1987 | Schellenberg et al. |
| 4,636,265 A | 1/1987 | Fischer et al. |
| 4,800,106 A | 1/1989 | Broadbent |
| 5,342,694 A | 8/1994 | Ahmed et al. |
| 5,500,460 A | 3/1996 | Ahmed et al. |
| 6,096,806 A | 8/2000 | Mueller et al. |
| 6,190,523 B1* | 2/2001 | Tazzia ........................... 204/484 |
| 6,613,387 B2 | 9/2003 | Agarwal et al. |
| 8,262,882 B2* | 9/2012 | Lingenfelter et al. ........ 204/486 |
| 2003/0149169 A1* | 8/2003 | Bammel et al. ............... 524/611 |

FOREIGN PATENT DOCUMENTS

| | | |
|---|---|---|
| EP | 0295713 A2 | 12/1988 |
| EP | 1788051 A1 | 5/2007 |
| WO | 0071337 A1 | 11/2000 |
| WO | 2009088993 A2 | 7/2009 |

OTHER PUBLICATIONS

International Search Report for PCT/US2014/025429 mailed Jul. 23, 2014, 2 pages.
Written Opinion for PCT/US2014/025429 mailed Jul. 23, 2014, 6 pages.
"Automotive E-Coat Paint Process Simulation Using FEA", by Frederick Hess and Ulises Gonzalez, 19 pages. Presented at the NAFEMS Ninth International Conference in Orlando, FL, USA on May 29, 2003.
"Epoxy Resins", cited in the specification as "Epoxy Polymers" on p. 10, chapter from vol. 6 of The Encyclopedia of Polymer Science and Engineering (Second Edition), by John Wiley & Sons.

* cited by examiner

*Primary Examiner* — Kishor Mayekar
(74) *Attorney, Agent, or Firm* — Mary K. Cameron

(57) ABSTRACT

Coating bath compositions and processes useful in depositing organic polymeric coatings on metal substrates at low voltages are provided, the baths comprising one or more dispersed organic film forming polymers; and an etchant; wherein the principle film forming polymer is stabilized in the bath by the presence of anionic surfactant, but can be readily anodically deposited under low voltage. The invention also relates to processes of depositing a coating and metal substrates coated using the baths and processes of the invention.

21 Claims, No Drawings

ELECTRODEPOSITION OF AN AUTODEPOSITABLE POLYMER

FIELD OF THE INVENTION

This invention relates to coating bath compositions and processes useful in depositing organic polymeric coatings on metal substrates at low voltages. More particularly, the invention relates to coating bath compositions comprising one or more dispersed organic film forming polymers; and an etchant; wherein the principle film forming polymer is stabilized in the bath by the presence of anionic surfactant, but can be readily anodically deposited under low voltage. The invention also relates to processes of depositing a coating and metal substrates coated using the baths and processes of the invention.

BACKGROUND OF THE INVENTION

Electrodeposition (also known as e-coat) and autodeposition are different methods of depositing an organic polymer-containing coating on metallic surfaces. The two methods are different in several aspects.

Autodeposition has been in commercial use on steel for about thirty years and is now well established for that use. For details, see for example, U.S. Pat. Nos. 3,063,877; 3,585,084; 3,592,699; 3,674,567; 3,791,431; 3,795,546; 4,030,945; 4,108,817; 4,178,400; 4,186,226; 4,242,379; 4,234,704; 4,636,264; 4,636,265; 4,800,106; and 5,342,694. Epoxy polymer-based autodeposition coating systems are described in U.S. Pat. No. 4,180,603 (Howell. Jr.); U.S. Pat. No. 4,289,826 (Howell Jr.); U.S. Pat. No. 5,500,460 (Ahmed et al.); and International Publication Number WO 00/71337. The disclosures of all these patents and published patent applications are hereby incorporated by reference to the extent that they are not specifically contradicted by the below teachings.

Autodeposition compositions are usually in the form of a liquid, usually aqueous solutions, emulsions or dispersions in which active metal surfaces of inserted objects are coated with an adherent polymer or polymer film that increases in thickness the longer the metal remains in the bath, even though the liquid is stable for a long time against spontaneous precipitation or flocculation of any polymer or polymer, in the absence of contact with the active metal. When used in the autodeposition process, the composition when cured forms a polymeric coating. "Active metal" is defined as metal that spontaneously begins to dissolve at a substantial rate when introduced into the liquid solution or dispersion. Such compositions, and processes of forming a coating on a metal surface using such compositions, are commonly denoted in the art, and in this specification, as "autodeposition" or "autodepositing" compositions, dispersions, emulsions, suspensions, baths, solutions, processes, methods or a like term. Autodeposition is often contrasted with electrodeposition. Although each can produce adherent films with similar performance characteristics, the dispersions from which they are produced and the mechanism by which they deposit are distinctly different.

E-coat is a dispersion of organic polymers and de-ionized water, which is in a generally stably dispersed state and does not deposit coatings in the absence of electrical current. The e-coat dispersion may also comprise solvent and some ionic components. When a D.C. voltage is applied across two electrodes immersed in the e-coat dispersion, the passage of current is accompanied by electrolysis of water. This results in oxygen gas being liberated at the anode (positive electrode) and hydrogen gas liberated at the cathode (negative electrode). The liberation of these gases disturbs the hydrogen ion equilibrium in the water immediately surrounding the electrodes. This results in a corresponding pH change and this in turn de-stabilizes the paint components of the dispersion and they coagulate onto the appropriate electrode.

Typical e-coat belongs to two types: anodic and cathodic electrodeposition.

Both anodic and cathodic electrodeposition processes and coatings have the following disadvantages: Limited throwing power, that is thinner or no coating of substrates' inner surfaces due to uneven distribution of the electrical field; the requirement for a pretreatment coating deposited on metal surfaces prior to electrodeposition paint coatings to improve corrosion resistance; poor heat resistance of resulting coatings, typically electrodeposition coatings are not resistant to temperatures greater than 200 degrees C.; poor flexibility of the coating leading to inconsistent or unacceptable performance in Reverse Impact ASTM D5420 testing. Commercially useful voltages for satisfactory electrodeposition in automotive industries commonly range from 200-400 volts making the process expensive to run. Both anodic and cathodic electrodeposition processes are multi-step processes requiring time and manufacturing floor space fore each step.

A typical E-coat Process Sequence includes:
1. Spray degreasing
2. Immersion degreasing
3. Water rinse.
4. Surface activation
5. Zinc phosphate coating (chromium free).
6. Demineralized water rinse dip
7. Demineralized water rinse dip
8. Demineralized water rinse spray
9. E-coating coating thickness from 10 up to 40 μm
10. UF cascade spray rinse.
11. UF rinse.
12. Demineralized water rinse spray
13. Drying of the parts—compressed air blow.
14. Three stage electric or gas baking of coating with thermal, infrared stove drying oven.

In anodic electrodeposition, a negatively charged organic polymer is dispersed in deionized water. Most anodic electrodeposition coating are derived from low molecular weight (1000 to 10,000 Daltons) solution polymerized, polymers having bound carboxylic acid groups to make them self dispersible. A substrate is submerged in an aqueous bath containing the negatively charged organic polymer and electricity is run through the bath with the substrate as the anode (positive electrode of the electrolytic cell). The negatively charged organic polymer moves to the anode and neutralization at the anode surface with the H+ ions generated from electrolysis water causes deposition of the negatively charged organic polymer on the anode.

In cathodic electrodeposition, a positively charged organic polymer is dispersed in deionized water. A substrate is submerged in an aqueous bath containing the positively charged organic polymer and electricity is run through the bath with the substrate as the cathode (negative electrode of the electrolytic cell). The positively charged organic polymer moves to the cathode and neutralization at the cathode surface with the OH-(hydroxide) ions generated at the cathode as result of electrolysis of water causes deposition of the positively charged organic polymer on the cathode.

Electrodeposition processing generally requires a pretreatment because the wet film is insufficiently porous to allow penetration of post treatments through the paint film to the substrate. Treatment agents which might desirably be introduced through the paint film to the underlying substrate cannot be utilized. In contrast, the initial wet film of an uncured autodeposited coating has sufficient porosity to allow use of treatment agents which penetrate the uncured autodeposition coating reach the underlying substrate.

Autodeposition compositions include organic polymers, often with surfactant molecules adsorbed on the polymeric species, dispersed in an aqueous liquid. Working autodeposition baths include significant amounts of activators for driving the autodeposition reaction, but are generally stable against coagulation or reaction in the absence of an active metal. In autodeposition processes, an active metal substrate is contacted with the autodeposition bath and cations are generated by dissolution of metals from the substrate by activators present in autodeposition baths without the need for applied electrical current. These cations complex with dispersed organic polymer species at the interface between the metal substrate and the autodeposition bath resulting in deposition of the organic polymer species and metals from the substrate onto surfaces of the metal substrate.

Conventional autodeposition treatment does not utilize an applied electrical current for deposition of a coating. In a typical autodeposition bath, generation of cations depends on the chemical dissolution of metals and follows galvanic series. This difference in dissolution creates galvanic couple formation at edges and defected areas where two metals are in contact with each other. The less active metal acts as a cathode and does not generate any cationic species to react with polymer particles resulting in nondeposition of polymer onto cathodic areas, i.e. edges and exposed noble areas of the galvanic couple, for example a cut edge of a galvanized substrate. These reactions lead to difficulty in uniformly coating composite metal parts or assemblies made up of different metal substrates, such as steel surfaces, zinc surfaces and aluminum surfaces. The different metals that make up the parts or assemblies each have different activity in the autodeposition bath relative to each other, which results in different coating characteristics.

It is desirable to develop a coating process that overcomes at least some of these drawbacks. Applicants have developed a coating bath and process utilizing a small applied potential to initiate and drive deposition in conjunction with etchant. This process overcomes the galvanic effect and allows the polymers to deposit evenly on dissimilar metals of an article to be coated.

SUMMARY OF THE INVENTION

Applicants have developed bath compositions and methods of coating that provide anodic deposition of one or more dispersed organic film forming polymers, wherein the principle film forming polymer is stabilized in the bath prior to deposition by the presence of anionic surfactant, e.g. epoxy-acrylic polymer dispersions.

In one aspect, the invention provides an anodic electrodeposition bath composition comprising: water, an anodically electrodepositable polymeric dispersion stabilized by anionic surfactant; an etchant system comprising an acid, and optionally an oxidizing agent. Generally the pH ranges from 1-4 and may be 2-3.

In one embodiment, the acid is selected from organic and inorganic acids in a concentration sufficient to provide a pH of less than 4.

In one embodiment, the etchant system comprises and iron dissolved in HF in an amount ranging from 0.015-0.3 g/l iron.

In one embodiment, the anodically electrodepositable polymeric dispersion stabilized by anionic surfactant comprises polymers having a weight average molecular weight of 100,000 to 1 million Daltons. In one embodiment, weight average molecular weight of all polymeric constituents of the anionically stabilized polymeric dispersion taken together is greater than or equal to 100,000 Daltons. In one embodiment, 10% to 50% of the polymeric constituents of the anionically stabilized polymeric dispersion are greater than 100,000 Daltons.

In one embodiment, the anodically electrodepositable polymeric dispersion stabilized by anionic surfactant is present at a concentration of approximately 1-20 wt %, preferably 2-10 wt % solids.

In one embodiment, the etchant system is present in a concentration less than a threshold concentration required to form a uniform coating on a metal surface from the anodically electrodepositable polymeric dispersion stabilized by anionic surfactant in the absence of an applied electrical current.

In one embodiment, the anodically electrodepositable polymeric dispersion stabilized by anionic surfactant comprises polymers selected from acrylic, epoxy, epoxy-acrylic, polyurethane, and vinyl based polymers. The anodically electrodepositable polymeric dispersion stabilized by anionic surfactant may comprise polymer particles comprising epoxy polymer and acrylic polymer. Desirably, the anodically electrodepositable polymeric dispersion stabilized by anionic surfactant is polymerized by miniemulsion and comprises portions of acrylic polymer and portions of epoxy polymer.

In some embodiments, the anodic electrodeposition bath composition comprises one or more pigments selected from carbon black, titanium dioxide, green pigment, yellow pigment, red pigment and blue pigment.

In one embodiment, the anodic electrodeposition bath composition has an added component of dissolved metallic element selected from one of Groups 2-14 and optionally phosphate ions. The bath composition may contain phosphate ions and a dissolved element selected from Ti, Zr, Hf, Al, Ge, B, Si and Sn; with or without fluorine.

In another aspect, the invention provides a method of generating a uniform anodic electrodeposition coating on a metal substrate comprising steps of:

a. Optionally, cleaning a metal substrate comprising metal surfaces of at least one of ferrous metals, zinciferous metals, aluminum, magnesium, and alloys thereof;
b. Providing the anodic electrodeposition bath according to the invention,
c. Providing a cathode in contact with said bath;
d. Placing the metal substrate as an anode in said bath; and
e. Passing a current of 0.5-100 volts through the anodic electrodeposition bath for a sufficient amount of time to produce a uniform anodic electrodeposition uncured coating on the metal substrate having a film coating thickness of from about 1 to about 50 microns;
f. Optionally rinsing the uniform anodic electrodeposition coated metal substrate.

When the rinsing step is used it may optionally comprise a plurality of rinsing substeps. The rinsing step, where present, may be performed with one or more rinses selected from heated water, unheated water, and an aqueous solution comprising a reaction rinse. Where the rinsing step f) comprises a plurality of rinsing substeps, said substeps each may be performed with one of said rinses selected from heated water, unheated water, and an aqueous solution comprising a reaction rinse.

The method may further comprise an additional step of heating the coated metal substrate at a temperature of greater than 100° C. for a time sufficient to cure the uniform anodic electrodeposition coating.

In one embodiment, a heating step comprises a sub-step wherein a paint is applied to the coated metal substrate, with or without a reduction in temperature during the sub-step, followed by further heating for a time sufficient to co-cure the uncured coating and the paint.

In one embodiment, the substrate to be coated metal substrate is a multi-metal substrate comprising metal surfaces of at least two of said ferrous metals, zinciferous metals, aluminum, magnesium, and alloys thereof.

In another aspect the invention provides an article of manufacture made according to the processes of the invention.

In one embodiment, the invention provides an article of manufacture comprising: a. one or more metal surfaces comprising at least one metal selected from ferrous metals, zinciferous metals, aluminum, magnesium, and alloys thereof; b. an anodic electrodeposition coating deposited on said one or more metal surfaces; said anodic electrodeposition coating comprising an integral conversion coating formed during anodic electrodeposition and comprising a metallic element selected from one of Groups 2-14, said metallic element being different from said at least one metal, and/or a reaction product of said metallic element with said metal surfaces.

In the inventive deposition method, deposition can be caused by complexation of metal cations with polymer and or ion pairing of the metal cations with surfactant, the metal cations being generated by applying electricity, where the article to be coated is placed as the anode. The compositions and processes are distinctively different than an anodic electrodeposition in terms of polymer and deposition chemistry. The anodic electrodepositing polymers, such as carboxylated polymers, are generally unstable at acidic pH of 4 or less. Polymers useful in the new process can be stable under acidic and alkaline conditions at a wide pH rage from 1-12, and differ from anodic as well as cathodic electrodeposition polymer chemistry.

Voltage requirements are generally less than 100 V, desirably 1-25 Volts. Current generally used is direct DC current, and AC and pulsed DC may also be used.

The means by which metal cations are provided where the metal substrate to be coated is placed as anode in the bath is by both chemical and electrical dissolution of the anode. In this new process these generated cations are utilized to coagulate polymer by ion pairing with the anionic surfactant stabilizing the polymer particles. The present invention deposits by destabilization of cations, electrically and chemically generated, which provides coatings that are uniformly deposited over multi-metal substrates.

Except in the stated aspects and the operating examples, or where otherwise expressly indicated, all numerical quantities in this description indicating amounts of material or conditions of reaction and/or use are to be understood as modified by the word "about" in describing the broadest scope of the invention. Practice within the numerical limits stated is generally preferred. Numerical ranges provided throughout the description and claims are meant to include all subset ranges, that is, it is intended that the range comprises all sub ranges found within the stated range, for example $C_{1-10}$ also discloses $C_{2-10}$, $C_{1-9}$ and $C_{3-7}$, and an amount of 1-100 also discloses 1-99, 2-100, and 45-50. Also, throughout this description, unless expressly stated to the contrary: percent, "parts of", and ratio values are by weight; the term "fluorometallate anions" as used herein includes anions containing fluorine and at least one of a transition metal and a metalloid; the description of a group or class of materials as suitable or preferred for a given purpose in connection with the invention implies that mixtures of any two or more of the members of the group or class are equally suitable or preferred; description of constituents in chemical terms refers to the constituents at the time of addition to any combination specified in the description or of generation in situ by chemical reactions specified in the description, and does not necessarily preclude other chemical interactions among the constituents of a mixture once mixed; specification of materials in ionic form additionally implies the presence of sufficient counter ions to produce electrical neutrality for the composition as a whole (any counter ions thus implicitly specified should preferably be selected from among other constituents explicitly specified in ionic form, to the extent possible; otherwise such counter ions may be freely selected, except for avoiding counter ions that act adversely to the objects of the invention); the term "paint" includes all like materials that may be designated by more specialized terms such as primer, lacquer, enamel, varnish, shellac, topcoat, and the like; and the term "mole" and its variations may be applied to elemental, ionic, and any other chemical species defined by number and type of atoms present, as well as to compounds with well defined molecules.

DETAILED DESCRIPTION OF PREFERRED EMBODIMENTS

The invention provides an anodic electrodeposition bath composition comprising: water, an anodically electrodepositable polymeric dispersion stabilized by anionic surfactant; an etchant system comprising an acid, and optionally an oxidizing agent. Basic constituents of a coating bath composition according to the invention are water, polymer solids dispersed in the aqueous medium of the composition, and an etchant.

To prepare a coating bath composition suitable for coating a metal or a multi-metallic substrate according to the invention, the anodically electrodepositable polymeric dispersion stabilized by anionic surfactant may be combined with at least one etchant component, which is capable of causing the dissolution of active metals (e.g., iron) from the surfaces of the substrate in contact with the bath composition. The etchant system is present in a concentration less than a threshold concentration required to result in autodeposition of a coating formed from the anodically electrodepositable polymeric dispersion stabilized by anionic surfactant in the absence of applied electrical current. In one embodiment, the amount of etchant present is the amount required to dissolve 1-10 mg equivalent weight of metal ions per minute per square foot of contacted surface at a temperature of 20° C. In one embodiment, the etchant(s) are utilized in a concentration effective to impart to the bath composition an oxidation-reduction potential that is at least 100 millivolts but is less than 400 millivolts as measured by a standard ORP electrode. The etchant component is preferably chosen from the group consisting of hydrofluoric acid and its salts, fluorosilicic acid and its salts, fluorotitanic acid and its salts, ferric ions, acetic acid, phosphoric acid, sulfuric acid, nitric acid, hydrogen peroxide, peroxy acids, citric acid and its salts, tartaric acid and its salts, or combinations thereof. In one embodiment, the etchant system comprises ferric iron dissolved in HF at a concentration of 0.015-0.3 g/l. In one embodiment, other etchants are used such that added HF, hydrogen peroxide, or ferric fluoride is absent from the working bath.

Useful polymers, can be styrene-acrylic, epoxy, epoxy-acrylic (such as in the Henkel Series 900 autodeposition composition), vinyl polymers (such as in the Henkel Series 800 autodeposition composition), polyurethane dispersions, or any other water dispersible negatively charged and/or ionically stabilized polymer. Acrylic polymers will be understood by those of skill in the art to include polymers containing acrylic acid, methacrylic acid, acrylic ester, and methacrylic ester based monomers, and mixtures thereof. Vinyl polymers will be understood by those of skill in the art to mean vinyl acetate, vinyl carbonates and vinyl ester polymers, for example polyvinylidene halogen esters, such as polyvinylidene chloride. All autodepositable polymers may be useful in the invention, whether they are a mini-emulsion or a non-mini-emulsion derived. Some autodepositable polymers are commercially available and methods of preparation of autodepositable polymers are known in the art. The anionically stabilized polymer particles are typically made by emulsion or miniemulsion polymerization techniques and are stable towards moderate pH changes.

In one embodiment, weight average molecular weight of all polymeric constituents of the anionically stabilized polymeric dispersion together is greater than or equal to 100,000 Daltons. In another embodiment, this average is greater than or equal to 20,000 Daltons. In another embodiment, this average is greater than or equal to 500,000 Daltons. Generally, the weight average molecular weight of all polymeric constituents of the anionically stabilized polymeric dispersion together ranges from 20,000 to 1,000,000. All of these molecular weights are different from typical E-coat polymers which have low weight average molecular weight, in a range of 1000 to 10,000 Daltons.

In one embodiment, significant weight fractions of greater than 100,000 Daltons are present, such that 10% to 50% of the polymeric constituents of the anionically stabilized polymeric dispersion are greater than 100,000 Daltons. In another embodiment, significant weight fractions of greater than 100,000 Daltons are present, such that 10% to 50% of the polymeric constituents of the anionically stabilized polymeric dispersion are greater than 100,000 Daltons.

In one embodiment, the polymer is made by miniemulsion polymerization. Epoxy polymer-ethylenically unsaturated monomer blends according to the invention are made by (a) dissolving or/and dispersing at least one epoxy polymer in at least one liquid ethylenically unsaturated monomer, optionally with latent cross-linker and/or coalescing agent, to form an epoxy-monomer blend; (b) dispersing the mixture of step (a) in water, optionally with surfactant, to form a crude particle dispersion, mechanically dispersing same to form a mini-emulsion; and (c) polymerizing the at least one ethylenically unsaturated monomer contained in the mini-emulsion to form an autodepositable polymeric epoxy dispersion. The type and concentration of epoxy polymer and ethylenically unsaturated monomer used can be varied to achieve specific performance properties including defect free coatings providing corrosion resistance, and flexibility on the surfaces of the substrate as well as continuous edge protection coatings. The type and concentration of ethylenically unsaturated monomer used can also be exploited as a means to provide improved compatibility with various pigmentation types.

Epoxy polymers useful in the present invention can be based on one or more epoxy polymers which contain one or more hydroxyl groups. Such epoxy polymers are well known substances and are described, for example, in the chapter entitled "Epoxy Polymers" in Volume 6 of The Encyclopedia of Polymer Science and Engineering (Second Edition). Methods of use according to the invention are based on epoxy polymers that contain within the same molecule: (i) one or more epoxide groups as well as (ii) one or more hydroxyl groups. Preferably, the epoxy polymer used contains one or more hydroxyl groups and approximately two epoxide groups per molecule.

Epoxy polymers are often described by the type of central organic moiety or moieties to which the 1,2-epoxy moieties are attached. Non-exclusive examples of such central moieties are those derived from bisphenol A, bisphenol F and their analogs in which one or two —NH2 moieties are substituted for an equal number of —OH moieties in the bisphenol; novolac condensates of formaldehyde with phenol and substituted phenols and their amino analogs, the condensates containing at least two aromatic nuclei; triazine; hydantoin; and other organic molecules containing at least two hydroxyl and/or amino moieties each, in each instance with as many hydrogen atoms deleted from hydroxy and/or amino moieties in the parent molecule as there are epoxy moieties in the molecules of epoxy polymer. Optionally, the 1,2-epoxide moieties may be separated from the central moieties as defined above by one or more, preferably only one, methylene groups. Oligomers of such monomers, either with themselves or with other organic molecules containing at least two hydroxyl and/or amino moieties each, may also serve as the central organic moiety.

Epoxy polymers useful for the present invention include glycidyl ethers of a polyhydric phenol, such as bisphenol A (a particularly preferred species of polyhydric phenol), bisphenol F, bisphenol AD, catechol, resorcinol, and the like.

Primarily for reasons of economy and commercial availability, it is generally preferred to utilize epoxy polymers derived from bisphenol A in this invention. More particularly, epoxy moiety containing molecules utilized in this invention preferably conform to the general chemical formula:

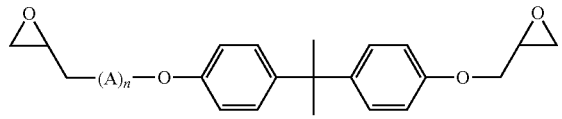

where:

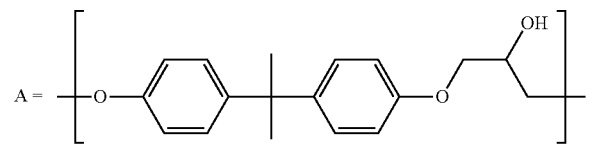

and "n" is an integer from 0 to 50. If such epoxy polymers are to be used directly as the polymer component of the present invention, "n" is preferably an integer within the range from about 1-30 so that each molecule contains at least one hydroxyl group. Commercially available epoxy polymers of this type are normally mixtures of molecules having somewhat different "n" values and different numbers of epoxy groups. Preferably, the epoxy polymer mixture used has a number average molecular weight in the range of from about 350 to about 5,000, more preferably in the range from about 400 to about 3000. Preferably, the average number of epoxide groups per molecule in the epoxy polymer mixture is in the range from 1.7 to 2.5, more preferably in the range from 1.9 to 2.1. The epoxy polymer mixture may contain polymer molecules in which n=0.

Other suitable epoxy polymers may include chain-extended epoxy polymers as well as flexibilizing epoxy polymers. In the former, a chain extender is utilized to react individual epoxy polymer molecules through their epoxy groups so as to form a polymer which is higher in average molecular weight than the starting epoxy polymer(s). A "flexibilizing epoxy polymer" may be defined as an epoxy polymer which when cured by itself with diethylene triamine (DETA) has a durometer Shore D reading not greater than 45. Suitable flexibilizing epoxy polymers include those compounds containing at least one epoxide group per molecule and one or more groups capable of increasing the flexibility of the cured autodeposited coating such as, for example, long aliphatic chains (e.g., polymethylene chains corresponding, for example, to the structure —(CH2)n- wherein "n" is preferably greater than 3, more preferably greater than 6. The polymethylene chains can be in the backbone of the flexibilizing epoxy polymer and/or pendent thereto), polyester chains (especially those formed by condensation of aliphatic diacids and glycols or glycol oligomers), polyoxyalkylene chains (e.g., polyether chains corresponding to the structure ((CH2)n—CHR-0-)m-, where: "n" is 0-3, "m" is 2 or greater, and R is H or alkyl), and the like. A particularly preferred flexibilizing epoxy polymer is a difunctional epoxy derived from cardanol (a phenol substituted with a long chain unsaturated hydrocarbon group which is obtained from cashew nut oil) having an epoxy equivalent weight of about 350.

Suitable ethylenically unsaturated monomers include, but are not limited to, vinyl aromatic hydrocarbons such as styrene and substituted styrenes, vinyl aliphatic hydrocarbons, ethylenically unsaturated acids such as acrylic and methacrylic acid as well as alkyl and hydroxyl-alkyl esters of such acids. Non-exclusive examples include butyl acrylate, methyl methacrylate, and hydroxyethyl methacrylate. Acrylonitrile, methacrylonitrile, acrylamide, and methacrylamide are also suitable. Combinations of any of the above monomers may find utility as well.

Ethylenically unsaturated monomers with anionic functionality are typically used. Anionic functional monomers, when co-polymerized into an emulsion or aqueous solution polymers, provide a "bound" source of ionic charges to effectively stabilize the emulsion polymer particles both during polymerization and subsequent formulation into coating compositions. One advantage offered is to minimize the use of an external surfactant. In addition, these anionic functional monomers may provide a "bound" source of sulfate or sulfonate groups to the polymer necessary for coating film formation to occur. Examples of suitable anionic functional monomers include, but are not limited to, 2-sulfoethyl methacrylate, 2-acrylamido-2-methylpropanesulfonic acid, styrene-sulfonic acid, vinylphosphonic acid, phosphate monomers such as PAM-100 and PAM-200 phosphate ester monomers available from Rhodia and corresponding salts of these monomers.

In one embodiment, phosphate monomers such as PAM-100 and PAM-200 available from Rhodia and corresponding salts of these monomers can be used as a portion of the ethylenically unsaturated monomer. The use of phosphate monomers such as PAM-100 and PAM-200 can provide improvements in mechanical and adhesive properties. It is generally preferred for the phosphate monomer(s) to be added after dispersion of the epoxy polymer and ethylenically unsaturated monomer and before or during polymerization of the monomer.

In another aspect of the present invention, hydroxyl functional ethylenically unsaturated monomer may be used. The use of hydroxyl functional ethylenically unsaturated monomer provides for a dispersion that has greater solvent resistance when used in conjunction with hydroxyl reactive crosslinking or curing agents. Non-exclusive examples of hydroxyl functional ethylenically unsaturated monomer include 2-hydroxylmethacrylate, hydroxyl acrylate, and hydroxylpropyl methacrylate.

The dispersions and coating compositions of the present invention may also contain one or more substances capable of reacting with the polymer end product to provide a crosslinked polymeric matrix in the cured coating. In one embodiment of the invention, at least a portion of the curing agents (sometimes referred to as crosslinking agents) only react with a polymeric epoxy dispersion end-product at the elevated temperatures typically encountered during the curing stage of the composition. Such curing agents are often referred to in the art as "latent" curing agents or hardeners because they only become activated when heated to a temperature well in excess of normal room temperature. The use of latent curing agents is preferred in the present invention so that substantial cross linking of the epoxy polymer or epoxy pre-polymer may be avoided prior to and during deposition on the surface of an article. In the case of metallic articles the deposition is typically carried out at temperatures of from about 20° C. to about 60° C. However, if so desired, minor amounts of more reactive curing agents may also be present in addition to the latent curing agents so as to accomplish partial crosslinking prior to deposition on an article. In one embodiment of the invention, at least one latent curing agent such as, for example, a blocked isocyanate is incorporated into the mixture before the at least one ethylenically unsaturated monomer is polymerized. Preferred blocked isocyanates comprise moderately reactive isocyanates such as aliphatic isocyanates and more sterically hindered and/or more acid stable blocking groups, such as those derived from the lactam of 6-aminohexanoic acid and/or benzotriazole. Typical stoving temperatures for such crosslinking agents are at or above 160° C. Utilization of such crosslinking agents avoids premature crosslinking from occurring during the polymerization process where temperatures are typically between ambient temperature and 100° C. Vestagon B 1530 from Degussa Corporation is one representative example.

The preferred crosslinking agents are generally selected so as to be capable of reacting with the hydroxyl groups and/or intact epoxide groups, which are present in the epoxy polymer and/or ethylenically unsaturated monomer. Hydroxyl groups are inherent to epoxy polymers as hydroxyl is formed upon ring opening of the epoxide, independent of whether this ring opening occurs in the advancement of the epoxy polymer, or by reaction of residual epoxy with acids such as HF in the coating bath. Hydroxyl groups can also be imparted if hydroxyl functional ethylenically unsaturated monomer is used.

Suitable crosslinking agents used in the present invention react with epoxide or hydroxyl moieties on the reactive epoxy-acrylic polymer in the autodepositable polymeric epoxy dispersion at the elevated temperatures found in the curing stage of the process, e.g., at least 100° C. The preferred crosslinking agents are believed to be reactive with hydroxyl groups as well as with any intact epoxide groups that may still be present in epoxy-acrylic polymer once it has been placed in the relatively acidic environment of an coating bath composition. Most, so or all, of such epoxide groups are believed likely to be hydrolyzed to produce hydroxyl groups. Furthermore, even if epoxy groups remain as such, there will normally be at least some hydroxyl groups available for crosslinking reactions such as esterification, etherification, and urethane formation.

Crosslinking agents are preferably molecules that are capable of rapid chemical addition reactions with epoxy and/or hydroxyl only when heated, but which exhibit little or no reactivity towards such moieties at temperatures preferably of 100° C., 120° C., 130° C., 140° C., 150° C. Such crosslinking agents are sometimes referred to in the art as latent curatives. Examples of suitable crosslinking agents include (a) molecules that contain: at least two epoxy and/or hydroxyl-reactive functional groups, such as thiol, hydroxyl, carboxyl, and carboxylic acid anhydride, and (b) molecules that contain at least two blocked isocyanate groups, each such group being blocked with a conventional blocking agent or internally blocked by formation of a uretdione structure, so that the blocked isocyanate group does not react at any appreciable rate at room temperature with hydroxyl groups but does react rapidly with such groups after being unblocked by heating to a temperature in excess of 100° C. The blocking groups can be derived from any suitable aliphatic, cycloaliphatic, aromatic, or alkylaromatic monoalcohol, monoamide, monoamine, or monoxime. Ketoximes are useful when unblocking at relatively low temperatures such as 120° C. is desired. More sterically hindered and/or more acid stable blocking groups, such as those derived from the lactam of 6-aminohexanoic acid and/or benzotriazole are preferred if unblocking is desired to begin at a substantial rate only at or above 160° C. The use of isophorone diisocyanate-based, epsiloncaprolactam blocked isocyanates as crosslinker is particularly preferred. If a blocked isocyanate-type crosslinker is utilized, the ratio of blocked isocyanate groups to hydroxy groups (NCO:OH) typically will be in the range of about 0.05 to about 1.2, more preferably about 0.1 to about 0.5. Other examples include blocked hexamethylene diisocyanates (HMDI).

Generally, the presence of a coalescing agent component in an coating composition according to the invention is preferred. This component is preferably selected from the group consisting of monoethers and monoesters of glycols, preferably glycols with at least one terminal hydroxy group. Monoethers of ethylene glycol are readily available and effective in blistering reduction but are restricted in use by antipollution laws in many locations and also have been found to be more likely than monoethers of propylene glycol to destabilize the emulsions formed in products according to the invention, such that monoethers of propylene glycol, particularly the n-butyl and phenyl monoethers of propylene glycol, are preferred from this class. When glycol monoethers are used, their percentage in an autodepositing liquid composition according to the invention preferably is within the range from about 0.5 to about 30, preferably about 18 to 26% of the total solids in the composition.

As coalescing agents, monoesters are slightly less preferred than monoethers where maximum corrosion resistance in the final product is needed, but are generally effective at lower concentrations and may therefore be preferred if economy and/or compliance with stringent solvent emission standards is more important than maximum corrosion resistance. A particularly preferred monoester is 2,2,4-trimethyl-1,3-pentanediol mono 2-methyl propionate. This and other monoesters if used preferably are present in an amount of at least 0.5% of the total autodepositing liquid composition and more preferably are present in amounts of about 1-10, and preferably about 2.5-5%.

In another aspect, an emulsifying agent, such as a surfactant, may be used to further or aid in the formation of the dispersion in water. Anionic surfactants are generally preferred, although amphoteric or nonionic surfactants may also be utilized. Combinations and mixtures of different surfactants may be employed. One class of preferred anionic surfactants for use in the present invention are ether sulfates that conform to general formula:

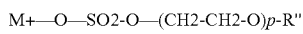

wherein: M represents a monovalent cation or monovalent fraction of cation of a higher valence, preferably, sodium or ammonium, and more preferably ammonium; p is a positive integer that preferably is between 2 and 7; and R" represents an alkyl or alkylaryl moiety, more preferably an alkyl phenol moiety. Independently, R" preferably has 8 to 30 carbon atoms, and more preferably has from 15 to 20 carbon atoms. Other suitable commercially available anionic emulsifiers include Dowfax™ 2A-1 (sodium salt of alkylated diphenyl oxide disulfonate); Abex™ 26-5; Texapon™ E-12 and K-12; Rhodapex™ CO-128, -433, and -436 and EP-100, -110, -115, -120, and -227; Disponsil™ AES-13, and Aerosol™ OT (sodium dioctylsulfosuccinate), and. Polystep™ B40 from Stepan. Preferred anionic emulsifying agents are salts of lauryl sulfate. The preferred amount of active anionic emulsifying agent is from about 0.1 to about 5 wt % based on the weight of the total composition of solids and is preferably from about 0.7 to about 2 wt %. A polymerizable anionic surfactant may be used to further or aid in the formation of the dispersion in water. Polymerizable anionic surfactants are widely known in the industry. Requirements for polymerizable anionic surfactants used in the present invention are that they should possess an anionic surfactant structure in addition to being a group capable of participating in radical polymerization. Binding the surfactant to the polymer in the dispersion improves stability and reduces levels of free surfactant required. Non-exclusive examples of polymerizable anionic surfactants may include sodium allyloxy hydroxypropyl sulfonate, and propenyl modified nonylphenol ethoxylate sulfate salts such as Hitenol A-10™, Hitenol BC-10™ and Hitenol BC-05™ (all products of DKS International, Inc.). Their Hitenol BC-10™ and Hitenol BC-05™ salts are particularly preferred.

Essentially any type of free radical generator can be used to initiate polymerization of the monomers. For example, free radical generating chemical compounds, ultraviolet light or radiation can be used. A chemical radical initiator may be added to facilitate the polymerization of the ethylenically unsaturated monomer within the epoxy containing micelle of the dispersion. Relative degrees of grafting, if any, between epoxy and polymerized monomer can be achieved to provide for specific molecular weights and specific performance ends by careful selection of the initiator type. Initiators may be added at various points in the process of forming the dispersion. In one aspect, the initiator is organic soluble and is introduced in the organic phase prior to dispersion of the epoxy and ethylenically unsaturated monomer in water. In another aspect, the initiator is water-soluble and is introduced after dispersion of the epoxy polymer/ethylenically unsaturated monomer mixture in water. In yet another aspect, both organic soluble initiators and water-soluble initiators are added. In yet a further aspect, an organic soluble initiator is introduced after the aqueous dispersion is formed. In this aspect, the organic soluble initiator may be either added directly or may be dissolved in a co-solvent and dripped into the dispersion.

Non-exclusive examples of suitable organic soluble initiators include peroxides, peroxy esters as well as organic soluble azo compounds. Benzoyl peroxide is one preferred example. Non-exclusive examples of suitable water-soluble initiators include hydrogen peroxide, tert-butyl peroxide, t-butyl peroxtoate, hydroperoxides such as t-butyl hydroperoxide, alkali metal (sodium, potassium or lithium) or ammonium persulfate; azo initiators such as azobisisobutyronitrile or 2,2'-azobis(2-amidinopropane)dihydrochloride; or mixtures thereof. Ammonium persulfate and Vazo® 68 WSP (Available from E.I. DuPont de Nemours) are two preferred examples. In one aspect, such initiators may also be combined with reducing agents to form a redox system. Non-exclusive examples of reducing agents may include sulfites such as alkali metal meta bisulfate, or hyposulfite, sodium thiosulfate, or isoascorbic acid, or sodium formaldehyde sulfoxylate. The free radical precursor and reducing agent together, referred to as a redox system herein, may be used at a level of from about 0.01% to 5%, based on the weight of monomers used. Non-exclusive examples of redox systems include: t-butyl hydroperoxide/sodium formaldehyde sulfoxylate/Fe (III); t-butyl hydroperoxide/isoascorbic acid/Fe(III); and ammonium persulfate/sodium bisulfite/sodium hydrosulfite/Fe(III). In another aspect, in the absence of peroxides, sodium formaldehyde sulfoxylate may be used to initiate polymerization in conjunction with at least one anionic surfactant, such as sulfates and sulfonates. Incorporation of anionic end groups resulting from this method provides an increased level of stability for the emulsion as well as the corresponding coating bath. Nonylphenol ethoxylate sulfate ammonium salt and sodium lauryl sulfate are two suitable non-exclusive examples.

In another aspect, the polymerization of the ethylenically unsaturated monomer is carried out with applied heat. A wide variety of temperatures can be employed and the specific optimum temperature varies with each initiator. Generally, persulfates are processed at a temperature from about 75 to about 90° C. Process temperatures for peroxides and azo compounds are generally chosen such that the half-life decomposition rate falls from about 1 to about 120 minutes. Alternatively, redox initiation methods are widely known in the art by which polymerization can be conducted at ambient or near ambient conditions.

Generally, additional ingredients may include fillers, biocides, foam control agents, pigments, soluble colorants, and flow control or leveling agents. The compositions of these various components may be selected in accordance with the concentrations of corresponding components used in conventional autodeposition compositions, such as those described in U.S. Pat. Nos. 5,500,460, and 6,096,806 and U.S. Ser. No. 09/578,935, the teachings of which are hereby incorporated by reference.

The additional ingredients may generally be selected for compositions according to this invention from materials established as satisfactory for similar uses in other autodepositing liquid compositions. Suitable materials include carbon black, phthalocyanine blue, phthalocyanine green, quinacridone red, hansa yellow, and/or benzidiac yellow pigment, titanium dioxide and the like; oxidizer and acid stable ingredients being preferred. Suitable flow control additives or leveling agents include, for example, the acrylic (polyacrylate) substances known in the coatings art such as the products sold under the trademark MODAFLOW™ by Solutia, as well as other leveling agents such as BYK-310™ (from BYK-Chemie), PERENOL™ F-60 (from Henkel), and FLUORAD™ FC-430 (from 3M).

A coating process according to this invention will preferably comprise the steps of: (a) contacting an article having a metal or multi-metal active surface with the aforedescribed composition and (b) passing a current through the composition with the article as the anode for a sufficient time to cause the formation of a film of the anodically electrodepositable polymeric dispersion stabilized by anionic surfactant (which film may also contain certain other components, such as a crosslinker, in the bath composition, to a predetermined thickness on the surface, (c) removing the coated metal or multi-metal surface from the bath composition, (d) rinsing the coated metal or multi-metal surface to remove at least some of the absorbed but otherwise unadhered components of the bath composition from the more adherent portion of the coating, and (e) heating the coated article to form a cured coating on the article.

The current to be used may be direct or alternating current, but is desirably direct current. Voltages are lower than for conventional e-coat and range between 1-100 V, and various selections of ranges therebetween, such as by way of non-limiting example: 1-10 volts, 2-50 volts, 10-30 volts and the like.

Preferably, contact between an active metal surface and the coating bath compositions of this invention is for a time between about 0.5 and about 10 minutes, more preferably between about 1 and about 3 minutes. Contact preferably is long enough to produce a final film thickness of from about 10 to about 50 microns (preferably about 18 to about 25 microns).

Optionally, a reagent capable of causing additional desirable reactions in or modifications of the coated film may be included in the post-coating water rinse. Such a reagent may also be brought into contact with the wet coated film after rinsing with water alone. Although the coating bath compositions of the invention generally produce wet coated films that can be heated after simple rinsing with tap or deionized water to give good quality final films, the corrosion resistance of the cured coating may be further improved by rinsing with an aqueous solution comprising reaction rinses containing one or more of phosphoric acid, hexafluorometallate acids or salts, an alkaline earth metal compound such as calcium nitrate. See for example co-owned U.S. Pat. No. 6,613,387 incorporated herein by reference in its entirety.

Final heating of the rinsed wet coated and optionally post-treated autodeposited film is preferably at a temperature of greater than 100° C. The curing temperature must be sufficiently high so as to effect reaction of any latent crosslinker with the epoxy- and hydroxyl-reactive functional groups of the autodepositable polymeric epoxy dispersion present in the autodeposited film. Generally, the final heating temperature is selected to dry and cure the coating at a temperature within the range from at least about 100° C. to about 250° C., more preferably between about 130° C. and 240° C., for a time of about 3 to about 60 minutes, more preferably for about 10 to about 30 minutes.

The heating can be performed in multiple stages, if desired. For example, the coated substrate may be heated in one or more of the following steps:

To a peak metal temperature of about 27° C. to about 100° C.;

To a peak metal temperature of about 27° C. to about 150° C.; and/or

To a peak metal temperature of about 100° C. to about 250° C.

In one embodiment, in a first stage lasting from about 5 to about 15 minutes, the coated substrate is heated to a peak metal temperature of about 55° C. to about 65° C. to flash off most of the residual water in the coating and in a second stage lasting from about 30 to about 50 minutes, the coated substrate is heated to a peak metal temperature of about 175° C. to about 250° C. The peak metal temperature preferably is attained in preferably, no more than about 10 minutes after the first heating stage has been completed.

Coatings according to the invention are also compatible with co-cure processes wherein a paint is applied to a dewatered uncured autodeposited coating and the two layers are cured together, see for example WO 2009088993.

In coating processes according to the invention, the metal surfaces to be coated can be ferrous metal, such as steel; non-ferrous metal, such as a aluminum, magnesium, and zinc; and alloys thereof. Zinc and zinc alloy substrates as well as zinc-coated, galvanized and galvannealed ferrous metal, and zinc-containing coatings are collectively referred to as "zinciferous metals". The articles to be coated may comprise one or more of the foregoing metals. Interfaces of dissimilar metals typically occur at joined panels of an assembly, for example an automotive assembly, and may occur at edges of metal workpieces comprising layers of dissimilar metals, for example the cut edge of a zinc or zinc alloy coated steel panel. Dissimilar metals will be understood by those of skill in the art to mean two metals that are "active metals" as described above, but having different metallurgical compositions such that the metals have different activity levels. A benefit of the invention is that multi-metal surfaces can be coated more uniformly.

The invention finds use in a variety of industries and is useful in coating active metal parts and particularly portions of various components such as automobile sheet components, such as doors, hoods, fenders and even entire assembled chassis, as well as automobile components such as shock absorbers, jacks, leaf springs, suspension components and brackets, and the like, and components of furniture such as drawer rails, and the like. Coatings according to the invention are particularly well suited for indoor metal furniture that is subjected to wear and surface impacts, e.g., filing cabinets, filing shelves, desks, etc.

The benefits of the present invention may be more fully appreciated after considering the following examples, which are given to provide further explanation, and not to unduly limit the scope of the invention.

EXAMPLES

Example 1a

Anionically Stabilized Mini-Emulsion

To a clean, 2-liter, 4-necked flask, equipped with agitator, nitrogen inlet, condenser and addition funnel was added a) 171.4 grams of epoxy polymer (ER) (solid epoxy polymer with epoxy equivalent weight around 900), and b) 21.8 grams of blocked isocyanate (BI)(caprolactam blocked isocyanurate of isophorone diisocyanate) were added to the flask. A homogeneous mixture of c) 56.5 grams of styrene (STY), d) 51.0 grams n-butyl acrylate (BA), e) 2.8 grams of methacrylic acid (MAA), f) 6.4 grams of hydroxylethyl methacrylate (HEMA), g) 54.5 grams of methyl methacrylate (MMA), and h) 14.6 grams of Ester alcohol (2,2,4-Trimethyl-1,3-pentanediol monoisobutyrate Propionic acid) (EA) was added to the flask and mixed until the epoxy polymer (solid epoxy polymer with epoxy equivalent weight around 900)(ER) and the blocked isocyanate (caprolactam blocked isocyanurate of isophorone diisocyanate)(BI) were dissolved. A homogeneous mixture of i) 4.7 grams of anionic surfactant (sodium lauryl sulfate) and j) 578.1 grains of deionized water (DI) were added to the flask over a period of 10 minutes with mixing. The crude dispersion was removed from the flask and passed through an M-110F Microfluidizer® (a product of Microfluidics Corporation) at 9000 to 10,000 psi to form a fine particle dispersion mini-emulsion of between 100 nm and 500 nm, where an average particle size was measured to be ~250 nm.

The fine particle dispersion or mini-emulsion was loaded into a two (2) liter flask under nitrogen atmosphere equipped with an agitator, condenser and a nitrogen inlet, along with addition funnels. Then, k) 0.25 grams of 1% ferrous sulfate, l) 0.12 grams of sodium formaldehyde sulfoxylate (SFS) and m) 5.0 grams of deionized water mixture were added respectively into the flask with mixing and then the contents of the flask was heated to 55° C. A mixture of n) 1.2 grams of sodium formaldehyde sulfoxylate and o) 10.2 grams of deionized water was then added to the flask at a uniform rate over a period of three hours. Midway through the addition period, a mixture of p) 1.8 grams of t-butyl hydroperoxide (t-B), and q) 10.2 grams of deionized water was added at a uniform rate over a period of 3 hours. During these additions, the contents of the flask were then heated to 65° C.

Once the addition was complete, the flask contents were maintained at 65° C. for a period of one hour. The final measured solids were 36.4% by weight.

Example 1b

Pigmented Coating Concentrate

The anionically stabilized mini-emulsion of example 1a was combined with 4.4 g of black pigment slurry @ 40.5% solids added to it, and the materials were allowed to mix for 10-60 minutes.

Example 2

Coating Baths

TABLE 1

| Bath | Example 1b concentrate | Deionized Water | Etchant | 5% HF | total | Bath pH |
|---|---|---|---|---|---|---|
| Bath 2A (comparative example) | 121.2 | 878.8 | 0.0 | 0.0 | 1000 | 6.2 |
| Bath 2B | 121.2 | 873.7 | 5.1 | 0.0 | 1000 | 3.0 |

Coating baths were prepared by mixing components as shown. The etchant used was ferric iron dissolved in HF at 30 g/l, and HF was introduced as a 5% solution in water.

Example 3

Coating Application

Baths were prepared for application by immersing clean cold rolled steel panels into a bath equipped with an anode and a cathode, the panel serving as the anode. Panels were coated from each bath using an immersion time of 1 minute. For each bath, application was made both with and without application of 25V DC. Coated panels were subsequently rinsed in cold water followed by warm water then baked 7 minutes at 177 C. Upon cooling, film build was measured for each panel and observations made.

TABLE 2

| Bath | Applied Voltage | Dry Film Thickness (mils) | Observation |
|---|---|---|---|
| 2a comparative | 25 V | 0.01 | No coating provided |
| 2a comparative | None | 0.00 | No coating provided |
| 2b | 25 V | 1.16 | Continuous Black film |

TABLE 2-continued

| Bath | Applied Voltage | Dry Film Thickness (mils) | Observation |
|---|---|---|---|
| 2b | None | 0.00 | No coating provided |

As shown, example 2b provides uniform coating with low applied voltage however the same composition which lacks the etchant (comparative 2a) does not provide coating nor does bath 2b when applied without voltage.

Example 4

Coating Application

Cleaned Cold rolled steel panels were coated for 1 minute as before however in each case the applied voltage was varied.

TABLE 3

| Bath | Applied Voltage | Dry Film Thickness (mils) | Observation |
|---|---|---|---|
| 2b | 25 V | 1.16 | Continuous Black film |
| 2b | 20 V | 1.10 | Continuous Black film |
| 2b | 15 V | 0.75 | Continuous Black film |
| 2b | 10 | 0.59 | Continuous Black film |
| 2b | 5 | 0.50 | Continuous Black film |
| 2b | 1 | 0.18 | Thin film, poor hiding |
| 2b | None | 0.00 | No coating provided |

As shown, embodiment 2b of the present example illustrates that coating composition which is comprised of an high molecular weight polymer emulsion which is stabilized by anionic surfactant can be used to provide continuous coatings of thickness sufficient to be considered industrially desirable, at voltages as low as 5 volts, resulting from a deposition mechanism which different from the prior art. Neither comparable example 2a, nor 2b coated without applied voltage show that under these conditions, deposition by solely electrodeposition or by solely autodeposition as taught in the prior art provide coating.

Example 5

Coating Application

An electrogalvanized panel was cut at the edges such that both zinc and steel surfaces are present. This panel was coated in bath 2b for 1 minute at an applied voltage of 25V, rinsed and baked as before. Continuous black coating was observed across the panel as well as across the cut edge, demonstrating improvement in ability to coat bimetallic objects relative to prior autodeposition coatings.

TABLE 4

| Bath | Panel | Voltage | Dry Film Thickness (mils) | Observation |
|---|---|---|---|---|
| 2b | EG with cut edge | 25 V | 1.43 | Continuous Black film across panel and cut edge |
| 2b | EG with cut edge | None | 0.07 | Minimal coating, no hiding provided |

Example 6

Two different coating baths were prepared using a composition containing an epoxy-acrylic emulsion polymer, made by mini-emulsion polymerization techniques, and pigment dispersed in water, as the makeup. The control bath 6a contained 4% NV and contained commercially available starter solution, Henkel Starter 300 as previously described.

The inventive bath 6b contained 10% NV and contained 1.6 g/L $H_2TiF_6$ (60%) and 0.32 g/L $H_3PO_4$ with a pH adjusted to 3.with aqueous ammonia.

TABLE 5

| Bath | Example 1b concentrate | Deionized Water | Additive | total |
|---|---|---|---|---|
| Bath 6A (comparative example by autodeposition) | 121.2 | 858.4 | 20.4 (ACC Starter 300) | 1000 |
| Bath 6B | 100.0 | 898 | 1.6 $H_2TiF_6$ (60%) + 0.32 $H_3PO_4$ | 1000 |

A series of cold rolled steel panels and hot dipped galvanized panels were coated with either bath 6a or bath 6b. Processing for bath 6a was per the manufacturer's instructions with a bath residence time of 2 minutes with no electrical current applied. Processing for bath 6b was a bath residence time of 45 seconds with a direct electrical current of 25 volts applied with the substrate as the anode.

The cold rolled steel panel showed a total film build of 1.05 mils with approximately 5 mg/ft$^2$ of Ti in the coating. Total conversion coating level is estimated to be 15-30 mg/ft$^2$, but it is currently to be tested where the integral conversion coating is located within the paint film.

The galvanized steel substrate showed a total film build of 1.2 mils total film build with approximately 8 mg/ft$^2$ of Ti in the coating. Total conversion coating weight was estimated to be 25-50 mg/ft$^2$.

Cold rolled steel panels coated in bath 6a or 6b, as well as hot dipped galvanized panels coated in bath 6b were subjected to corrosion testing according to GM 9540P (40 cycles), wherein a coated panel is scribed through the paint down to the underlying metal and subjected to a salt solution and high temperature environments in a cyclic fashion.

The galvanized steel substrate coated using the process and bath of 6b showed almost no corrosion after 40 cycles. Cold rolled steel panels coated using the process and bath of 6b showed improved results as compared to the control panel 6a. Results similar to commercial autodeposition composition coatings post-treated with a reaction rinse were achieved on cold rolled steel treated in bath 6b with no reaction rinse or separate conversion step being used. This shows a significant improvement in corrosion resistance in the absence of a conversion coating pre-treatment for cold rolled steel.

The foregoing invention has been described in accordance with the relevant legal standards, thus the description is exemplary rather than limiting in nature. Variations and modifications to the disclosed embodiment may become apparent to those skilled in the art and do come within the scope of the invention. Accordingly, the scope of legal protection afforded this invention can only be determined by studying the following claims.

What is claimed is:

1. An anodic electrodeposition bath composition comprising: water, an anodically electrodepositable polymeric dispersion stabilized by anionic surfactant; an etchant system comprising an acid, and optionally an oxidizing agent; wherein the etchant system is present in a concentration less than a threshold concentration required to result in autodeposition of a coating formed from the anodically electrodepositable polymeric dispersion stabilized by anionic surfactant in the absence of applied electrical current.

2. The anodic electrodeposition bath composition according to claim 1, wherein the acid is selected from organic and inorganic acids in a concentration sufficient to provide a pH of less than 4.

3. The anodic electrodeposition bath composition according to claim 1, wherein said etchant system comprises hydrofluoric acid (HF) and ferric iron ions dissolved in said hydrofluoric acid, said ferric iron ions being present in an amount ranging from 0.015-0.3 g/l.

4. The anodic electrodeposition bath composition according to claim 1, wherein the anodically electrodepositable polymeric dispersion stabilized by anionic surfactant comprises polymers having a weight average molecular weight of 100,000 to 1 million Daltons.

5. The anodic electrodeposition bath composition according to claim 1, wherein weight average molecular weight of all polymeric constituents of the anionically stabilized polymeric dispersion taken together is greater than or equal to 100,000 Daltons.

6. The anodic electrodeposition bath composition according to claim 1, wherein 10% to 50% by weight of the polymeric constituents based on total polymeric constituents of the anionically stabilized polymeric dispersion are greater than 100,000 Daltons.

7. The anodic electrodeposition bath composition according to claim 1, wherein the anodically electrodepositable polymeric dispersion stabilized by anionic surfactant is present at a concentration of approximately 1-20 wt % solids based on total solids.

8. The anodic electrodeposition bath composition according to claim 1, wherein the anodically electrodepositable polymeric dispersion stabilized by anionic surfactant comprises polymers selected from the group consisting of acrylic, epoxy, epoxy-acrylic, polyurethane, and vinyl based polymers.

9. The anodic electrodeposition bath composition according to claim 1 wherein the anodically electrodepositable polymeric dispersion stabilized by anionic surfactant comprises polymer particles comprising epoxy polymer and acrylic polymer.

10. The anodic electrodeposition bath composition according to claim 1 wherein the anodically electrodepositable polymeric dispersion stabilized by anionic surfactant is polymerized by miniemulsion and comprises portions of acrylic polymer and portions of epoxy polymer.

11. The anodic electrodeposition bath composition according to claim 1, further comprising one or more pigments selected from the group consisting of carbon black, titanium dioxide, green pigment, yellow pigment, red pigment and blue pigment.

12. The anodic electrodeposition bath composition according to claim 1, further comprising an added component of dissolved metallic element selected from one of Groups 2-14 and optionally phosphate ions.

13. The anodic electrodeposition bath composition according to claim 1, further comprising phosphate ions; a dissolved element selected from the group consisting of Zr, Hf, Al, Ge, B and Sn.

14. A method of generating a uniform anodic electrodeposition coating on a metal substrate comprising steps of:
  a. Optionally, cleaning a metal substrate comprising metal surfaces of at least one metal selected from the group consisting of ferrous metals, zinciferous metals, aluminum, magnesium, and alloys thereof;
  b. Providing the anodic electrodeposition bath according to claim 1,
  c. Providing a cathode in contact with said bath;
  d. Placing the metal substrate as an anode in said bath; and
  e. Passing a current of 0.5-100 volts through the anodic electrodeposition bath for a sufficient amount of time to produce a uniform anodic electrodeposition uncured coating on the metal substrate having a film coating thickness of from about 1 to about 50 microns;
  f. Optionally rinsing the uniform anodic electrodeposition coated metal substrate.

15. The method according to claim 14, wherein the rinsing step f), optionally comprising a plurality of rinsing substeps, is performed with one or more rinses selected from heated water, unheated water, and an aqueous solution comprising a reaction rinse.

16. The method according to claim 15, wherein, the rinsing step f) comprises a plurality of rinsing substeps, said substeps each being performed with one of said rinses selected from heated water, unheated water, and an aqueous solution comprising a reaction rinse.

17. The method according to claim 14, further comprising an additional step of heating the coated metal substrate at a temperature of greater than 100° C. for a time sufficient to cure the uniform anodic electrodeposition coating.

18. The method according to claim 17, wherein the heating step comprises a sub-step wherein the uncured coating is dewatered and then a paint is applied to the dewatered uncured coating on the metal substrate, with or without a reduction in temperature during the sub-step, followed by further heating for a time sufficient to co-cure the uncured coating and the paint.

19. The method according to claim 14, wherein the metal substrate is a multi-metal substrate comprising metal surfaces of at least two of said metals wherein said at least two of said metal are dissimilar metal having different activity levels; said multi-metal substrate further comprising interfaces of the dissimilar metals and step e) deposits said coating by destabilization of cations, electrically and chemically generated, thereby providing coatings uniformly deposited over said interfaces.

20. The method according to claim 14, wherein the anodic electrodeposition bath further comprises an added component of dissolved metallic element, different from the metal substrate, selected from one of Groups 2-14 and optionally phosphate ions.

21. The method according to claim 20, further comprising forming an integral conversion coating during anodic electrodeposition step e), said integral conversion coating comprising the dissolved metallic element, different from the metal substrate, selected from one of Groups 2-14; and/or a reaction product of said dissolved metallic element with said metal surfaces.

* * * * *